F. E. CUDELL.
SEWER GAS TRAP.
APPLICATION FILED APR. 15, 1908.
909,871.
Patented Jan. 19, 1909.
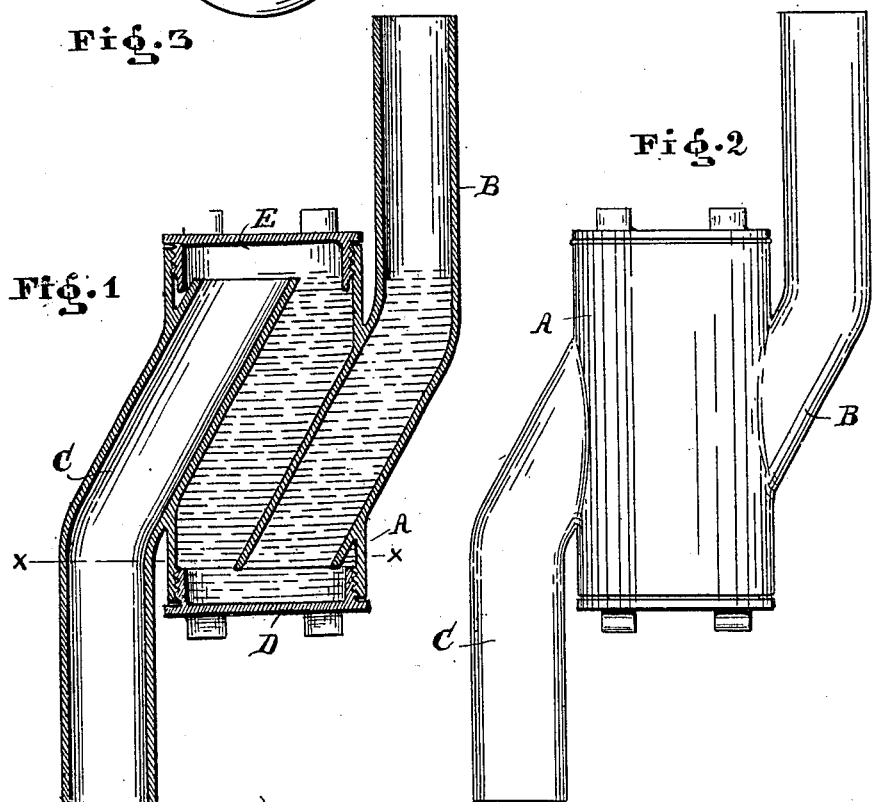
INVENTOR
Frank E. Cudell
BY B. F. Eibler Atty.
WITNESSES

UNITED STATES PATENT OFFICE.

FRANK E. CUDELL, OF CLEVELAND, OHIO.

SEWER-GAS TRAP.

No. 909,871.      Specification of Letters Patent.      Patented Jan. 19, 1909.

Application filed April 15, 1908. Serial No. 427,161.

*To all whom it may concern:*

Be it known that I, FRANK E. CUDELL, a citizen of the United States, residing at Cleveland, in the county of Cuyahoga and State of Ohio, have invented certain new and useful Improvements in Sewer-Gas Traps, of which the following is a specification.

The invention relates to traps in waste-pipes for the prevention of the escape of sewer-gases, and has for its object to provide a non-siphoning trap, with a deep water-seal, and an all around scouring water current without increasing the general dimensions of the ordinary low water-seal siphoning pot-traps.

The invention consists in the combination of a trap-chamber and an inlet and outlet pipe, both extending into the chamber, whereby a water-seal is made in said chamber. The chamber is provided with removable cleanout caps on top and bottom, but they may be placed vertically on the cylinder.

In the accompanying drawing Figure 1 is a vertical section of the trap. Fig. 2 is a side view. Fig. 3 is a top view. Fig. 4 is a horizontal section through the lower part of the chamber, and Fig. 5 is the ordinary combination of a pot trap.

A is an open cylinder.

B is a steep slanting inlet pipe, extending low down into the cylinder so as to provide a high water-seal, and also to spread the water-current to scour the inside of the cylinder.

C is a steep slanting outlet-pipe extending high up inside of the cylinder, so as to produce a high water seal, and a scouring water action in the upper part of the cylinder. The steep slanting inlet and outlet pipes may as indicated, extend vertically, horizontally or any desired direction outside of the trap.

D and E are cleanout-caps. Cap E extends into the water to exclude sewer-gas from the washer joint. Said caps may be placed vertically on the cylinder.

Having described my invention, I claim:

In a trap of the type as above referred to the combination with the cylinder A of an inlet pipe B and an outlet pipe C penetrating the sides of the cylinder in acute angular direction and terminating in close proximity of the top and bottom cap of said cylinder in the manner as shown and for the purpose described.

FRANK E. CUDELL.

Witnesses:
BERNH. F. EIBLER,
FRANK HIGLEY.